United States Patent
Chia

(10) Patent No.: US 9,377,366 B2
(45) Date of Patent: Jun. 28, 2016

(54) NAVIGATION DEVICE INCLUDING THERMAL SENSOR

(71) Applicant: PIXART IMAGING INC., Hsin-Chu County (TW)

(72) Inventor: Chin-Wee Chia, Penang (MY)

(73) Assignee: Pixart Imaging Inc., Hsin-Chu County (TW)

( * ) Notice: Subject to any disclaimer, the term of this patent is extended or adjusted under 35 U.S.C. 154(b) by 332 days.

(21) Appl. No.: 13/936,364

(22) Filed: Jul. 8, 2013

(65) Prior Publication Data

US 2015/0009140 A1    Jan. 8, 2015

(51) Int. Cl.
- *G01K 3/10* (2006.01)
- *G06F 3/03* (2006.01)
- *G06F 3/038* (2013.01)
- *G06F 3/0354* (2013.01)

(52) U.S. Cl.
CPC *G01K 3/10* (2013.01); *G06F 3/038* (2013.01); *G06F 3/0317* (2013.01); *G06F 3/03543* (2013.01)

(58) Field of Classification Search
CPC .............................. G01K 3/10; G06F 3/03543
See application file for complete search history.

(56) References Cited

U.S. PATENT DOCUMENTS

| | | | |
|---|---|---|---|
| 7,189,985 B2* | 3/2007 | Xie et al. | 250/559.29 |
| 2002/0118170 A1* | 8/2002 | Iaria | G06F 3/30543 345/163 |
| 2005/0231482 A1* | 10/2005 | Theytaz et al. | 345/166 |
| 2007/0008286 A1* | 1/2007 | Theytaz et al. | 345/166 |
| 2008/0117412 A1* | 5/2008 | Leong et al. | 356/73 |
| 2011/0025604 A1* | 2/2011 | Chang | 345/166 |
| 2011/0288805 A1* | 11/2011 | Dejnabadi et al. | 702/96 |

FOREIGN PATENT DOCUMENTS

| | | |
|---|---|---|
| TW | I315467 B | 10/2009 |
| TW | 201027401 A | 7/2010 |
| TW | 201316163 A | 4/2013 |

\* cited by examiner

*Primary Examiner* — Quan-Zhen Wang
*Assistant Examiner* — Xuemei Zheng
(74) *Attorney, Agent, or Firm* — Rosenberg, Klein & Lee

(57) ABSTRACT

A navigation device includes a thermal sensor and a processing unit. The thermal sensor is configured to output temperature readings of a work surface. The processing unit is configured to identify a lift event according to the temperature readings.

20 Claims, 3 Drawing Sheets

NAVIGATION DEVICE INCLUDING THERMAL SENSOR

BACKGROUND

1. Field of the Disclosure

This disclosure generally relates to an input device and, more particularly, to a navigation device including a thermal sensor.

2. Description of the Related Art

Generally, an optical navigation device is operated on a work surface and configured to detect a displacement with respect to the work surface according to image frames captured by a CCD image sensor. In order to improve the operational convenience, the optical navigation device is coupled to a host through wireless communication techniques, and the host performs corresponding operations according to the displacement.

In order to extend the service time of the battery module in the optical navigation device, the optical navigation device can have the function of detecting a lift event according to the image frames captured by the CCD image sensor. For example, when the optical navigation device detects that it is lifted by a user, a part of the elements are disabled so as to reduce the total power consumption. However, in order to identify the lift event, the optical navigation device has to post-process the image frames. In other words, besides for calculating the displacement, the image frames captured by the CCD image sensor are also for identifying whether the lift event occurs or not. However, it is not simple to identify the lift event according to the image frames captured by the CCD image sensor and complicated calculation is necessary.

Accordingly, the present disclosure further provides a navigation device that may detect whether a lift event occurs or not by further employing a thermal sensor.

SUMMARY

The present disclosure provides a navigation device including a thermal sensor, wherein the navigation device performs the tracking operation according to reflection images and identifies a lift event according to temperature readings.

The present disclosure further provides a navigation device including a thermal sensor, wherein the navigation device is operated on a work surface and configured to detect a displacement with respect to the work surface and to identify a lift event.

The present disclosure provides a navigation device including an image sensor, a thermal sensor and at least one processing unit. The image sensor is configured to capture reflection images of the work surface. The thermal sensor is configured to output temperature readings of the work surface. The processing unit is configured to perform tracking operation according to the reflection images and to identify a lift event according the temperature readings.

The present disclosure further provides a navigation device including a light source, an image sensor, a thermal sensor and at least one processing unit. The light source is configured to emit a main beam to the work surface and the wok surface reflects the main beam to generate a main reflection optical path. The image sensor is located on or outside the main reflection optical path and configured to capture reflection images of the work surface. The thermal sensor is configured to output temperature readings of the work surface. The processing unit is configured to perform tracking operation according the reflection images and to identify a lift event according to the temperature readings.

The present disclosure further provides a navigation device including an infrared light source, a thermal sensor and a processing unit. The infrared light source is configured to illuminate the work surface. The thermal sensor is configured to output temperature readings of the work surface. The processing unit is configured to identify a lift event according to the temperature readings.

In one aspect, the processing unit calculates a temperature value according to the temperature readings, and identifies the lift event according to the temperature value or a temperature variation of the temperature value. For example, when the temperature value is smaller than or equal to a temperature threshold and/or when the temperature variation is larger than or equal to a variation threshold, the processing unit identifies that the lift event occurs, wherein the temperature readings may be voltage signals.

In one aspect, when the processing unit identifies that the lift event occurs, the navigation device may enter a sleep mode or a hovering mode, wherein in the sleep mode the image sensor is disabled and the thermal sensor operates continuously; whereas in the hovering mode, the navigation device may perform the hovering operation according to an accelerometer or a second image sensor.

In one aspect, the thermal sensor may be the sensor configured to sense thermal energy, such as a MEMS thermal sensor, a bolometer array, an infrared photo detector, a microbolometer or the like.

The navigation device of the present disclosure may detect a lift event or a lifted height according to the temperature readings outputted by the thermal sensor and may enter a sleep mode or a hovering mode accordingly.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
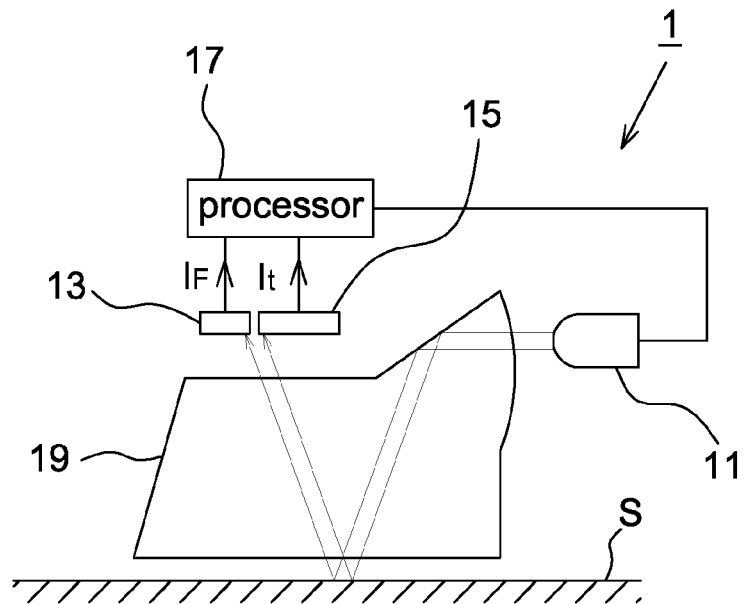
FIG. 1A shows a schematic diagram of the navigation device according to an embodiment of the present disclosure, wherein the navigation device is not lifted.
Figure 1B:
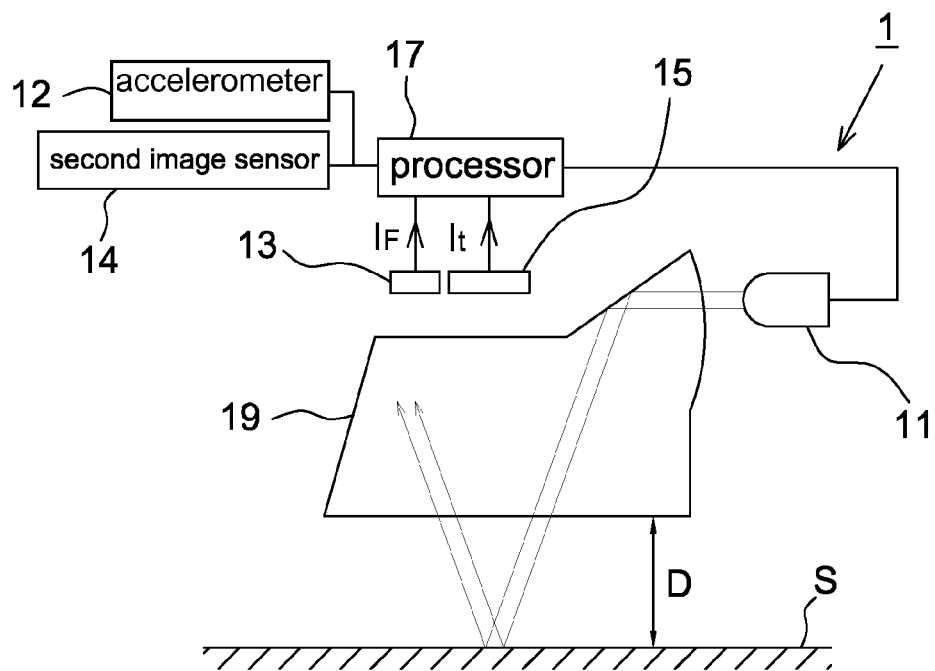
FIG. 1B shows a schematic diagram of the navigation device according to the embodiment of the present disclosure, wherein the navigation device has been lifted.

Referring to FIGS. 1A and 1B, they show a schematic diagram of the navigation device 1 including a thermal sensor according to an embodiment of the present disclosure; FIG. 1A shows that the navigation device 1 is not lifted by a user (not shown) and FIG. 1B shows that the navigation device has been lifted (e.g. a height D) by the user. In this embodiment, when the navigation device 1 is operated on a work surface S, the navigation device 1 is configured to detect a displacement or a moving vector with respect to the work surface S; whereas when the navigation device 1 is lifted, the navigation device 1 may enter a sleep mode or a hovering mode, wherein in the sleep mode a part of elements of the navigation device 1 may be disabled or slowed down, and in the hovering mode the navigation device 1 may operate according to the detection result of an accelerometer or a second image sensor. The second image sensor may be a CCD image sensor, a CMOS image sensor or the like.

In this embodiment, the navigation device 1 includes a light source 11, an image sensor 13, a thermal sensor 15, a processing unit 17 and a light guide 19. In one embodiment, the navigation device 1 may be an optical mouse, and the above elements included by the navigation device 1 are disposed inside a housing of the mouse, but the present disclosure is not limited thereto.

Figure 2A:
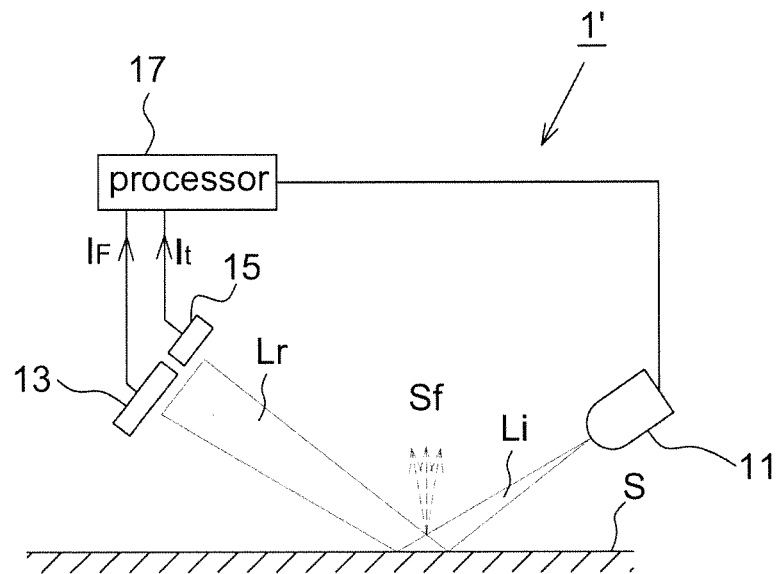
FIGS. 2A-2C show schematic diagrams of different arrangements of the navigation device according to the embodiment of the present disclosure respectively.
Figure 2B:
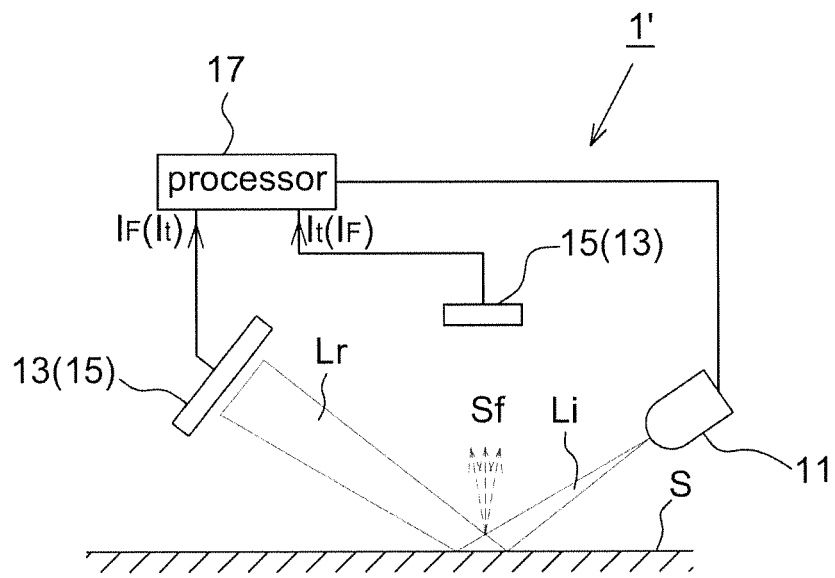
Figure 2C:
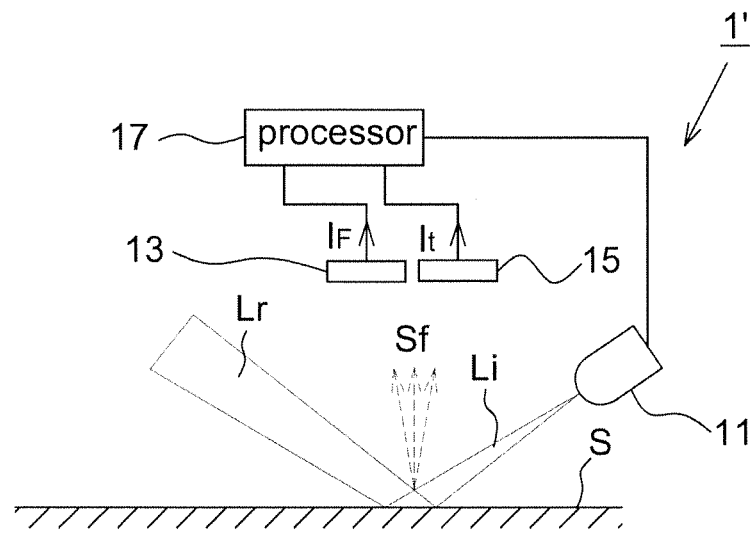

The light source 11 may be a single infrared light source or formed by arranging a plurality of infrared light sources, and is configured to illuminate the work surface S. For example, the light source 11 is configured to emit a main beam Li to the work surface S, and the work surface S reflects the main beam Li to generate a main reflection optical path Lr (as shown in FIGS. 2A-2C), wherein as the work surface S is generally not a perfect mirror surface, a scattered field Sf may be formed outside the main reflection optical path Lr. Assuming the light source 11 emitting light with the same brightness, when the work surface S is smoother, light intensity of the main reflection optical path Lr is stronger and light intensity of the scattered field Sf is weaker. On the contrary, when the work surface is rougher, light intensity of the main reflection optical path Lr is weaker and light intensity of the scattered field Sf is stronger. According to the dispositions of the image sensor 13 and the thermal sensor 15, so called bright field arrangement or dark field arrangement may be formed (described later with examples). When the navigation device 1 is lifted, the light energy emitted by the light source 11 can not be efficiently received by the image sensor 13 and the thermal sensor 15.

The image sensor 13 may be a CCD sensor, a CMOS sensor or other sensors for converting optical energy to electrical signals. The image sensor 13 is configured to capture and output reflection images $I_F$ of the work surface S, wherein the reflection images $I_F$ may be digital images.

The thermal sensor 15 may be the sensor for sensing thermal energy, e.g. a MEMS thermal sensor, a bolometer array, an infrared photo detector, a microbolometer or the like. The thermal sensor 15 is configured to capture and output temperature readings It of the work surface S, wherein the temperature readings It may be voltage signals.

The processing unit 17 may be a digital signal processor (DSP) and is coupled to the image sensor 13 and the thermal sensor 15. The processing unit 17 is configured to perform tracking operation according to the reflection images $I_F$, e.g. continuously calculating a displacement or a moving vector of the navigation device 1 with respect to the work surface S according to the correlation between successive reflection images $I_F$, wherein the method of calculating the displacement or the moving vector according to the correlation between images is well known and thus details thereof are not described herein.

The processing unit 17 is further configured to identify a lift event according to the temperature readings It. In one embodiment, the processing unit 17 calculates a temperature value T according to the temperature readings It, and identifies whether the lift event occurs or not according to the temperature value T or a temperature variation $\Delta T$ of the temperature value, wherein the temperature value T may be an average temperature or a maximum temperature. For example, when the temperature value T is smaller than or equal to a temperature threshold Tth and/or when the temperature variation $\Delta T$ (e.g. a decrement) is larger than or equal to a variation threshold $\Delta Tth$, it means that the navigation device 1 is lifted by a predetermined height such that the thermal sensor 15 is not able to efficiently sense the thermal energy of the work surface S. Accordingly, the processing unit 17 may identify that the lift event occurs, wherein the predetermined height may be determined according to different applications.

When identifying that the lift event occurs, the processing unit 17 may perform corresponding operations according to different applications. For example in one embodiment, when the processing unit 17 identifies that the lift event occurs, the navigation device 1 is controlled to enter a sleep mode or a hovering mode. In the sleep mode, the processing unit 17 may disable or slow down the activity of a part of elements so as to reduce the power consumption, e.g. disabling the image sensor 13. However, in order to be able to continuously detect whether the navigation device 1 returns to the work surface S or not, in the sleep mode the thermal sensor 15 preferably operates continuously. In another embodiment, when the processing unit 17 identifies that the lift event occurs, the processing unit 17 may perform the hovering operation. For example, the navigation device 1 may further include an accelerometer 12 (FIG. 1B) for operating in the hovering mode or includes a second image sensor 14 (FIG. 1B) configured to capture images of at least one predetermined object (e.g. reference beacon images) so as to perform the hovering operation according to the image variation between the object images.

In one embodiment, when the navigation device 1 is lifted, all elements including the image sensor 15 may be switched off so as to significantly reduce the total power consumption. During lifted condition, only the thermal sensor 15 and the detector circuit thereof (e.g. the processing unit 17) are activated. When the navigation device 1 returns to the work surface S, the leaping of temperature is detected by the thermal sensor 15 so that the processing unit 17 is able to wake up the navigation device 1 accordingly.

For example in one embodiment, the processing unit 17 is configured to identify whether the sleep mode or hovering mode is ended according to the temperature value T or a temperature variation $\Delta T$ of the temperature value. For example, under the sleep mode or hovering mode, when the temperature value T is larger than or equal to a first temperature threshold Tth' and/or when the temperature variation $\Delta T$ (e.g. an increment) is larger than or equal to a first variation threshold $\Delta Tth'$, it means that the navigation device 1 returns to the work surface S such that the sleep mode or hovering mode is ended; wherein the temperature threshold Tth and the first temperature threshold Tth' may be determined according to actual applications (e.g. the sensitivity) and may or may not be equal to each other, and the variation threshold $\Delta Tth$ and the first variation threshold $\Delta Tth'$ may also be determined according to actual applications (e.g. the sensitivity) and may or may not be equal to each other.

The light guide 19 is configured to direct the light emitted by the light source 11, e.g. directing the light emitted from the light source 11 to the work surface S and then directing the reflected light from the work surface S to the image sensor 13 and the thermal sensor 15. It should be mentioned that the shape and the structure of the light guide 19 do not have any limitation as long as it is able to sequentially direct the light emitted from the light source 11 to the work surface S as well as the image sensor 13 and the thermal sensor 15. In addition, if the light emitted from the light source 11 may be directly received by the image sensor 13 and the thermal sensor 15 because of dispositions of every element, the light guide 19 may not be implemented or replaced by a lens or lens set(s). In addition, the light guide 19 may only be configured to direct the light emitted by the light source 11 to the work surface S or may only be configured to direct the reflected light from the work surface S to the image sensor 13 and thermal sensor 15.

Referring to FIGS. 2A-2C, bright/dark arrangements formed by the dispositions of the image sensor 13 and the thermal sensor 15 with respect to the light source 11 are described hereinafter.

In FIG. 2A, the image sensor 13 and the thermal sensor 15 are disposed on the main reflection optical path Lr simultaneously so as to form the bright field arrangement in which the image sensor 13 and the thermal sensor 15 are configured to detect the optical energy of the main reflection optical path Lr.

In FIG. 2B, the image sensor 13 is disposed on the main reflection optical path Lr whereas the thermal sensor 15 is disposed outside the main reflection optical path Lr; i.e. the image sensor 13 forms the bright arrangement whereas the thermal sensor 15 forms the dark arrangement. Or, the image sensor 13 is disposed outside the main reflection optical path Lr whereas the thermal sensor 15 is disposed on the main reflection optical path Lr; i.e. the image sensor 13 forms the dark arrangement whereas the thermal sensor 15 forms the bright arrangement.

In FIG. 2C, the image sensor 13 and the thermal sensor 15 are disposed outside the main reflection optical path Lt simultaneously so as to form the dark field arrangement in which the image sensor 13 and the thermal sensor 15 are configured to detect the optical energy of the scattered field Sf.

It should be mentioned that in FIGS. 2A-2C, the main beam Li and the main reflection optical path Lr may be directed by at least light guide or lens, and for simplification FIGS. 2A-2C do not show the light guide or lens. In addition, the method of calculating the displacement according to the reflection images $I_F$ captured by the image sensor 13 in the bright/dark field arrangement is well known and thus detailed thereof are not described herein. The present disclosure is to identify whether the navigation device 1 is lifted or not according to the temperature readings It outputted by the thermal sensor 15.

Figure 3:
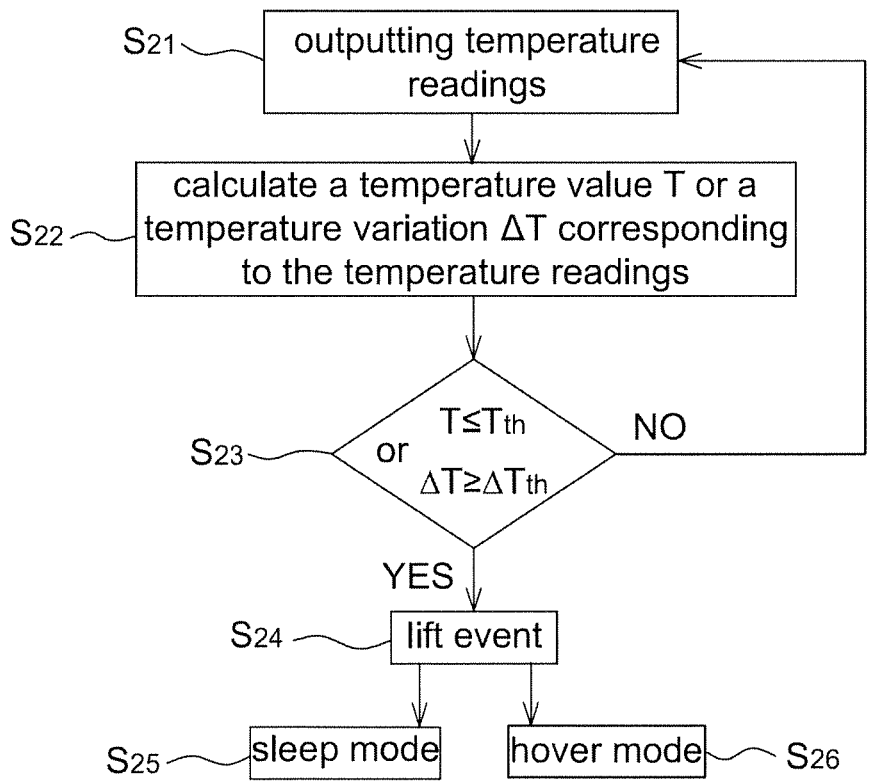
FIG. 3 shows a flow chart of the lift-event identification method of the navigation device according to an embodiment of the present disclosure.

Referring to FIG. 3, it shows a flow chart of the lift-event identification method of the navigation device according to an embodiment of the present disclosure, which includes the steps of: outputting temperature readings with a thermal sensor (Step $S_{21}$); calculating a temperature value T or a temperature variation ΔT corresponding to the temperature readings (Step $S_{22}$); comparing the temperature value T with a temperature threshold Tth and/or comparing the temperature variation ΔT with a variation threshold ΔTth (Step $S_{23}$); when the temperature value T is larger than the temperature threshold Tth and/or the temperature variation ΔT is smaller than the variation threshold ΔTth, identifying that the lift event does not occur and returning to the Step $S_{21}$; when the temperature value T is smaller than or equal to the temperature threshold Tth and/or the temperature variation ΔT is larger than or equal to the variation threshold ΔTth, identifying that the lift event occurs (Step $S_{24}$); when the lift event occurs, entering a sleep mode (Step $S_{25}$) or a hovering mode (Step $S_{26}$), wherein the mode entered may be determined according to different applications. It should be mentioned that in the Step $S_{23}$, it is an option for the processing unit 17 to compare only one of the temperature value T and the temperature variation ΔT rather than comparing both of them. That is, if the temperature value T is too low, it means that the thermal sensor 15 is not able to efficiently detect the thermal energy of the work surface S. The temperature variation ΔT indicates the thermal energy variation between two or a predetermined number of temperature readings, wherein the predetermined number may be previously determined according to the sensitivity. In addition, details of the identification method of this embodiment have been described in FIGS. 1A-2C and their corresponding descriptions and thus details thereof are not repeated herein.

In another embodiment, the navigation device 1 may further include a memory unit configured to save at least one temperature threshold or at least one temperature variation threshold. For example, when a plurality of thresholds are saved in the memory unit, the processing unit 17 may further identify a lifted height according to the comparison result of the temperature value and the plurality of thresholds and perform different hovering operations according to different heights. As mentioned above, the navigation device 1 may further include an accelerometer or a second image sensor for operating in the hovering mode. When the lift event occurs and different heights are identified, the hovering operation may be performed with different operating characteristics.

In addition, the image sensor 13 and the thermal sensor 15 may retrieve data at different sampling frequencies. For example, when the navigation device 1 enters the sleep mode, the thermal sensor 15 may retrieve the temperature readings at a lower sampling frequency.

In other embodiments, the processing unit 17 may further generate thermal images according to the temperature readings It and calculate the displacement with respect to the work surface S according to the thermal images. In this manner, the image sensor 13 may not be implemented. In other words, the processing unit 17 may calculate the displacement and perform the navigation operation according to the variation of the temperature distribution between successive thermal images.

In addition, although FIGS. 1A-2C show that the image sensor 13 and the thermal sensor 15 shares the same light source 11, the present disclosure is not limited thereto. As long as the light guide and the disposition of elements are properly designed, the image sensor 13 and the thermal sensor 15 may be associated with different light sources.

In the embodiments of the present disclosure mentioned above, the image sensor 13, the thermal sensor 15 and the processing unit 17 may be integrated on the same substrate, e.g. forming a single chip structure. In another embodiment, a first processing unit may be configured to process the reflection images captured by the image sensor 13 and a second processing unit may be configured to process the temperature readings outputted by the thermal sensor 15. The second processing unit may further be configured to inform the first processing unit to control the operation (e.g. shut down) of the image sensor 13 or directly control the operation of the image sensor 13; i.e. two processing units are included in the navigation device of the present disclosure and respectively coupled to the image sensor 13 and the thermal sensor 15.

As mentioned above, the conventional optical mouse identifies whether a lift event occurs or not by analyzing reflection images captured by an image sensor and the correct identification generally needs complicated calculations. Therefore, the present disclosure further provides a navigation device including a thermal sensor (FIGS. 1A-2C) in which images of the work surface captured by an image sensor are only for tracking operation and temperature readings outputted by a thermal sensor are for identifying whether the navigation device is lifted or not. The navigation device performs the corresponding operations according to the outputs of the image sensor and the thermal sensor respectively.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device, configured to be operated on a work surface, the navigation device comprising:
    a light guide comprising a light emergent surface;
    an image sensor facing the light emergent surface and configured to capture reflection images of the work surface according to light emerging from the light emergent surface;
    a bolometer facing the same light emergent surface of the same light guide as the image sensor and configured to output temperature readings of the work surface according to the light emerging from the light emergent surface; and
    at least one processing unit configured to perform tracking operation according to the reflection images and identify a lift event according to the temperature readings.

2. The navigation device as claimed in claim 1, wherein the image sensor is a CCD image sensor or a CMOS image sensor.

3. The navigation device as claimed in claim 1, further comprising a light source configured to illuminate the work surface.

4. The navigation device as claimed in claim 3, wherein the light guide is configured to direct light emitted by the light source.

5. The navigation device as claimed in claim 1, wherein the processing unit is configured to calculate a temperature value according to the temperature readings, and identify the lift event according to the temperature value or a temperature variation of the temperature value.

6. The navigation device as claimed in claim 5, wherein when the temperature value is smaller than or equal to a temperature threshold or when the temperature variation is larger than or equal to a variation threshold, the processing unit identifies that the lift event occurs.

7. The navigation device as claimed in claim 1, wherein when the processing unit identifies that the lift event occurs, the navigation device enters a sleep mode or a hovering mode.

8. The navigation device as claimed in claim 7, wherein in the sleep mode the image sensor is disabled and the bolometer is operated continuously.

9. A navigation device, configured to be operated on a work surface, the navigation device comprising:
    a light guide comprising a light emergent surface;
    a light source configured to emit a main beam to the work surface and the work surface reflecting the main beam to generate a main reflection optical path;
    an image sensor
        facing the light emergent surface,
        located on or outside the main reflection optical path, and
        configured to capture reflection images of the work surface according to light emerging from the light emergent surface;
    a bolometer facing the same light emergent surface of the same light guide as the image sensor and configured to output temperature readings of the work surface according to the light emerging from the light emergent surface; and
    at least one processing unit configured to perform tracking operation according to the reflection images and identify a lift event according to the temperature readings.

10. The navigation device as claimed in claim 9, wherein the image sensor is a CCD image sensor or a CMOS image sensor.

11. The navigation device as claimed in claim 9, wherein the processing unit is configured to calculate a temperature value according to the temperature readings, and identify the lift event according to the temperature value or a temperature variation of the temperature value.

12. The navigation device as claimed in claim 11, wherein when the temperature value is smaller than or equal to a temperature threshold or when the temperature variation is larger than or equal to a variation threshold, the processing unit identifies that the lift event occurs.

13. The navigation device as claimed in claim 9, wherein when the processing unit identifies that the lift event occurs, the navigation device enters a sleep mode or a hovering mode.

14. The navigation device as claimed in claim 13, wherein in the sleep mode the image sensor is disabled and the bolometer is operated continuously.

15. A navigation device, operated on a work surface, the navigation device comprising:
    a light guide comprising a light emergent surface;
    an infrared light source configured to illuminate the work surface;
    an image sensor facing the light emergent surface and configured to receive light emerging from the light emergent surface;
    a bolometer facing the same light emergent surface of the same light guide as the image sensor and configured to output temperature readings of the work surface according to the light emerging from the light emergent surface; and
    a processing unit configured to identify a lift event according to the temperature readings.

16. The navigation device as claimed in claim 15, wherein the processing unit is configured to calculate a temperature value according to the temperature readings, and identify the lift event according to the temperature value or a temperature variation of the temperature value.

17. The navigation device as claimed in claim 16, wherein when the temperature value is smaller than or equal to a temperature threshold or when the temperature variation is larger than or equal to a variation threshold, the processing unit identifies that the lift event occurs.

18. The navigation device as claimed in claim 15, wherein when the processing unit identifies that the lift event occurs, the navigation device enters a sleep mode or a hovering mode.

19. The navigation device as claimed in claim 18, wherein in the sleep mode the bolometer is operated continuously.

20. The navigation device as claimed in claim 18, further comprising an accelerometer operating in the hovering mode.

* * * * *